US012424806B2

(12) United States Patent
Ellensohn et al.

(10) Patent No.: US 12,424,806 B2
(45) Date of Patent: Sep. 23, 2025

(54) PLUG CONNECTOR WITH SCREW CONNECTION

(71) Applicant: HIRSCHMANN AUTOMOTIVE GMBH, Rankweil/Brederis (AT)

(72) Inventors: Kurt Ellensohn, Goetzis (AT); Alexander Schmid, Rankweil (AT); Markus Battisti, Hard (AT); Jan-Patrick Schulz, Bodolz (DE); Jonas Daenicke, Dornbirn (AT)

(73) Assignee: Hirschmann Automotive GmbH, Rankweil/Brederis (AT)

( * ) Notice: Subject to any disclaimer, the term of this patent is extended or adjusted under 35 U.S.C. 154(b) by 356 days.

(21) Appl. No.: 17/917,414

(22) PCT Filed: Apr. 16, 2021

(86) PCT No.: PCT/EP2021/059952
§ 371 (c)(1),
(2) Date: Oct. 6, 2022

(87) PCT Pub. No.: WO2021/213928
PCT Pub. Date: Oct. 28, 2021

(65) Prior Publication Data
US 2023/0163541 A1 May 25, 2023

(30) Foreign Application Priority Data
Apr. 20, 2020 (DE) .......................... 102020110642.4

(51) Int. Cl.
H01R 24/84 (2011.01)
H01R 13/03 (2006.01)
(Continued)

(52) U.S. Cl.
CPC ............. *H01R 24/84* (2013.01); *H01R 13/03* (2013.01); *H01R 13/512* (2013.01); *H01R 13/516* (2013.01)

(58) Field of Classification Search
CPC ...... H01R 24/84; H01R 13/03; H01R 13/512; H01R 13/516; H01R 4/70; H01R 11/26;
(Continued)

(56) References Cited

U.S. PATENT DOCUMENTS 9,048,551 B2 6/2015 Picaud
9,847,593 B2 12/2017 Nunner
(Continued)

FOREIGN PATENT DOCUMENTS

CN 205051058 U * 2/2016
DE 102015216543 A 3/2017
(Continued)

OTHER PUBLICATIONS

Machine Translation CN 205051058, dated (Feb. 24, 2016) (Year: 2024).*

Primary Examiner — Travis S Chambers
(74) Attorney, Agent, or Firm — Harness, Dickey & Pierce, P.L.C.; Anthony G. Fussner

(57) ABSTRACT

A plug-in connection comprises a plug-in connector (1) and a mating plug-in connector that can be plugged together with the latter. The plug-in connector (1) has a housing (2) into which an electrical conductor (3) is inserted. The electrical conductor (3) is electrically contacted with a contact partner (4) likewise arranged in the housing (2) by means of their surfaces coming to rest on each other. The contact partner (4) is contacted via its circumferential end face (5) with a contact partner of the mating plug-in connector in such a way that the end faces come to rest on each other. The plugging-together is effected and supported by a screw (6).

(Continued)

The screw includes insulation (e.g., insulating element (12) or a coating) such that the screw (6) does not touch voltage-carrying parts such as the electrical conductor (3) and/or the contact partner (4).

20 Claims, 2 Drawing Sheets

(51) Int. Cl.
 H01R 13/512 (2006.01)
 H01R 13/516 (2006.01)
(58) Field of Classification Search
 CPC .............. H01R 13/447; H01R 2101/00; H01R 2201/26; H01R 4/34; H01M 50/552; H01M 50/562; H01M 50/567
 See application file for complete search history.

(56) References Cited

U.S. PATENT DOCUMENTS

| | | | |
|---|---|---|---|
| 10,205,274 B2 * | 2/2019 | Loncar | ..................... H01R 4/56 |
| 10,312,610 B1 * | 6/2019 | Olivera Brizzio | ... H01R 12/585 |
| 10,381,752 B2 | 8/2019 | Kaehny | |
| 10,591,114 B1 * | 3/2020 | Lassen | .................. F21V 15/013 |
| 2015/0018625 A1 * | 1/2015 | Miraki | ............... A61B 17/0206 |
| | | | 600/219 |

FOREIGN PATENT DOCUMENTS

| | | | | |
|---|---|---|---|---|
| DE | 102016206846 A | | 10/2017 | |
| DE | 102020130894 A1 * | | 2/2021 | ............ F16B 37/061 |

\* cited by examiner

PLUG CONNECTOR WITH SCREW CONNECTION

CROSS REFERENCE TO RELATED APPLICATIONS

This application is the US-national stage of PCT application PCT/EP2021/059952 filed 16 Apr. 2021 and claiming the priority of German patent application 102020110642.4 itself filed 20 Apr. 2020.

FIELD

The invention relates to a plug-in connection consisting of a main plug connector and a mating plug connector that can be plugged together, according to the features of the preamble of the independent patent claims.

BACKGROUND

A plug-in connection is known from U.S. Pat. No. 9,048,551 and is shown in FIG. 1 of this patent.

In order to transmit high current, it is necessary that the main plug connector is not only plugged together with the mating plug connector, but that at least one fastener is also provided that aids the plug-in process and, after the termination of the plug-in process, leaves the main plug connector is solidly fixed in the mating plug connector.

Such plug-in connections are used in particular in the high-voltage range, for example at voltages greater than 42 volts, and/or in the transmission of high currents, so that care must be taken to ensure that the current-carrying parts cannot be touched. This applies both to the plugged-together state of the plug-in connection, but also for the case in which the plug-in connector and the mating plug-in connector have not yet been plugged together.

Therefore, as disclosed, for example, in above-cited US '551, it is necessary for the current-carrying parts, in particular also the fastener, to be protected from being touched. The fastener, for example a screw, is made of metal, since, even though it does not conduct any electrical voltages or currents, the required tightening and fixing forces can be realized, which are not only required during the plugging-together but also have to be permanently applied during the use of the plug-in connection.

Above-cited US '551 shows that the fastener is a screw that is surrounded on the one hand by an insulating sleeve and on whose free end, on the other hand, an insulating cap made of plastic is mounted and that points toward the mating plug connector. The voltage-conducting parts (contacts of the main plug connector and the screw) are effectively protected from being touched, in particular with a finger, by the insulation sleeve in conjunction with the insulating cap.

SUMMARY

The object of the invention is to provide the touch protection of such a plug-in connection, in particular the plug-in connectors thereof, in an alternative manner.

This object is achieved on the one hand in that the fastener, in particular the screw, consists entirely of an electrically nonconductive material, such as a plastic, for example. Such a fastener, in particular a screw, can be produced easily and cost-effectively from the electrically nonconductive material and is therefore particularly well suited for large numbers.

Furthermore, a fastener that is made completely of electrically nonconductive material, is considered when the tightening forces with which the main plug connector and the mating plug connector are brought together are not too high. On the other hand, when certain tightening forces are exceeded, a fastener, in particular a screw of electrically nonconductive material is no longer considered since the required tightening forces can no longer be withstood by this material. In addition, such a material does not come into consideration above all, if certain requirements are placed on the long-term stability of the plug-in connection.

On the other hand, the object is achieved in that the fastener, in particular the screw, consists in its core of a metal material that is provided on its surface at least in those regions in which it can be touched, preferably completely with an electrically nonconductive coating. This may be, for example, a nanocoating, a plastic encapsulation or the like. With such a fastener, in particular the screw, with a core made of a metal material, the tightening forces that are not achieved with a plastic material can readily be achieved. The required long-term stability of the plug-in connection, namely when plug-in connectors and mating plug-in connectors have been plugged together and brought into permanent operative connection with the fastener, can also be achieved with the fastener, in particular the screw which consists of the metal material in its core. At the same time, the contact protection is achieved by the electrically nonconductive coating.

Furthermore, the object is achieved in an alternative embodiment in that the fastener, in particular the screw, consists of a metal material as in the prior art, but is insulated in the main plug connector by additional means from the voltage-carrying parts of the main plug connector, in particular its electrical conductor and/or its contact. For this purpose, a corresponding insulating element, for example made of plastic, is provided. As a result, additional means for achieving the touch protection, such as, for example, the cap 7 from the prior art, which is plugged onto the end-side end of the screw, are dispensed with.

In a particularly important embodiment of the invention, the insulating element has a circumferential flange and an insulating sleeve adjoins the circumferential flange of the insulating element, and the circumferential flange and the insulating sleeve consist of different electrically nonconductive materials. The outer diameter of the circumferential flange is larger than the throughgoing hole for the insulating element in the electrical conductor, in particular in the busbar, whereas the outer diameter of the insulating sleeve largely corresponds to the inner diameter of the throughgoing hole of the insulating element, so that this insulating element can be fitted into the throughgoing hole in the electrical conductor. In order, on the one hand, to avoid leakage currents and to achieve the contact protection and, on the other hand, to realize the required tightening forces with the fastener, in particular the screw, and to ensure the long-term stability, the circumferential flange of the insulating element is produced from another electrically nonconductive material different from the material of the insulating sleeve. This is because the region of the insulating sleeve is not acted upon by the tightening forces and compressive forces of the fastener and can therefore be produced from another, in particular a more cost-effective material such as for example plastic. That region of the insulating element, namely the circumferential flange that is acted upon by pressure forces and in the plugged-together state of the plug-in connection, so that it is subjected to permanent forces, is produced from a material that permanently withstands these forces.

The plastic material of the insulating sleeve can be, for example, polybutylene terephthalate (PBT, or also PTMT), polyether ether ketone (PEEK is a semicrystalline thermoplastic with very good mechanical properties, also under thermal stress, which is also distinguished by its high permanent use temperature) or the like. The insulating sleeve thus consists entirely, for example, of one of the above-mentioned materials. As an alternative to this, however, it is also possible to produce the insulating sleeve from more than one material, for example from two or even more materials. For example, a core of the insulating sleeve can consist of the one material (possibly also a metal material) and the exterior of this insulating sleeve can be coated or surrounded with another material (in any case an electrically insulating material).

In contrast, the circumferential flange of the insulating element consists of harder materials, such as ceramic or metal materials, for example. Since a ceramic material (for example aluminum oxide $Al_2O_3$) is electrically insulating, the circumferential flange can only consist of this one material, so that, for example, a further coating of ceramic material can be dispensed with or can be carried out entirely. If the circumferential flange of the insulating element consists of a metal material, it is necessary to coat or surround the latter so that it is no longer electrically conductive. Such a cover can be effected, for example, by applying a plastic (here the materials such as for the insulating sleeve), but also by coating, anodization and the like, can be achieved with an insulating effect. For example, a core of the circumferential flange is made of metal (such as aluminum) that is anodized to achieve insulation. Nevertheless, the use of plastic materials for the circumferential flange is not excluded. Thus, for example, the material with the designation "PEEK GF20" or "PEEK GF30" comes into consideration, this material being a polyether ether ketone (PEEK) reinforced a glass fibers. An reinforced plastic (PEEK) is also suitable.

If the insulating element consists of individual parts, in particular of the two individual parts, namely the circumferential flange and the insulating sleeve, it is still necessary to put together these parts after the manufacture, in particular of these two individual parts, separately from one another. The connection of these two individual parts takes place, for example, by pressing, gluing or the like. The circumferential flange has a throughgoing hole through which the insulating sleeve is guided and fixed. This configuration is suitable for pressing the insulating sleeve with its outer surface in the throughgoing hole in the circumferential flange. An upper circumferential end of the insulating sleeve advantageously is flush with the one surface of the circumferential flange. Alternatively, it is conceivable to arrange an upper circumferential end of the insulating sleeve on the surface of the circumferential flange and to fix it there.

As an alternative to the above-described two-piece or multipart design of the insulating element of different materials, it is conceivable for the insulating element to be of one piece and to consist entirely of a single insulating material, in particular of PEEK GF20, PEEK GF30 (or comparable materials) or of a ceramic material or of an anodized metal. Instead of anodizing the metal material, it can also be formed in be made electrically insulating in this one-piece component (for example by a lacquer, a plastic coating or the like).

As already stated, the one-piece insulating sleeve, as well as the two- or multipart insulating sleeve, for example only made of PEEK GF 20 or PEEK GF 30 or generally of a filled or even of an unfilled plastic and optionally of further insulating materials, can thus be made. Further embodiments of the invention from which the corresponding advantages result are described in the dependent claims and are also explained in connection with the following description of the figures.

DETAILED DESCRIPTION

Figure 1:
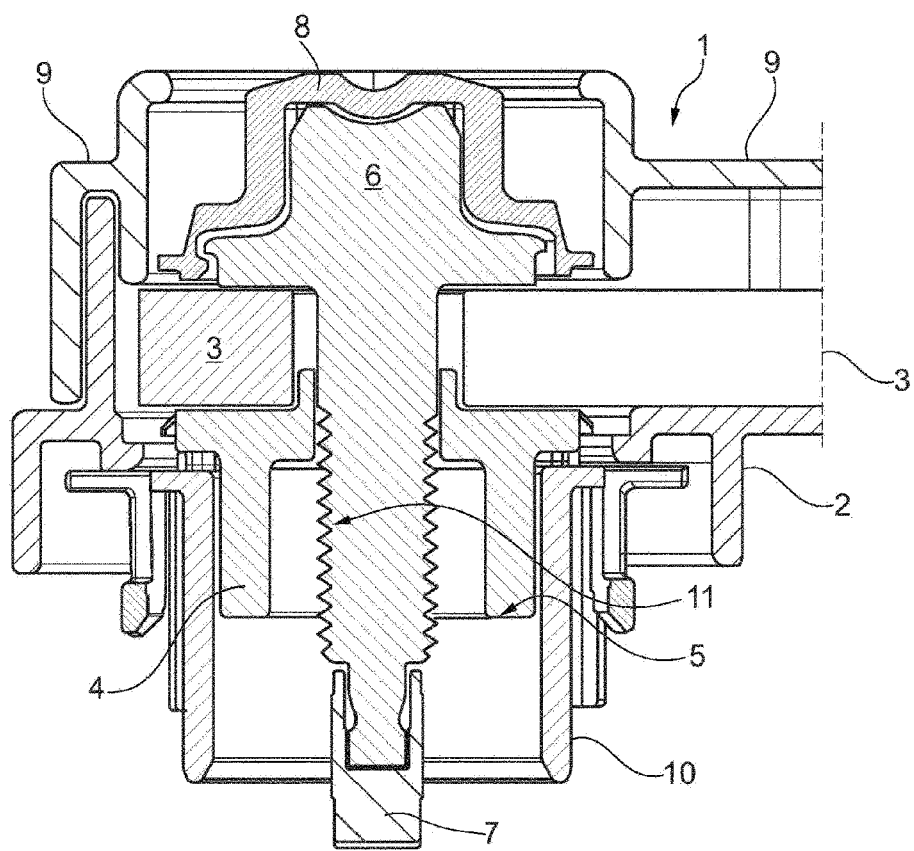
FIG. 1 shows a prior-art embodiment of a main plug connector known from U.S. Pat. No. 9,048,551.

Both an embodiment from the prior art (FIG. 1) and an embodiment according to the invention (FIGS. 2 to 4) are shown in the drawing.

FIG. 1 shows the prior-art embodiment of a main plug connector 1 known from the above-cited American patent. The latter has a housing 2 into which projects an electrical conductor 3, for example a busbar for high-voltage applications. The electrical conductor 3 is electrically contacted with a contact 4 that is also in the housing 2, in that its surfaces engage each other. In this embodiment, the contact 4 is in turn formed as a sleeve that can but however does not have to be contacted with its circumferential end face 5 with a contact (not shown) of a mating plug connector in such a way that the end faces, more precisely their surfaces come into contact with each other. In order to accomplish this, the main plug connector 1 and the mating plug connector (not shown) are plugged together and this mating process is effected and aided by a fastener that in this embodiment is a screw 6.

In order to prevent electrical contact with the free end of the screw 6, a cap 7 made of an electrically nonconductive material, such as a plastic, for example, is at this end.

The end region facing away from the free end of the screw 6, namely the screw head, is provided with a further cover 8 that also prevents electrical contact with the screw 6. In addition, a further cover 9 is provided on the housing 2, in particular for securing the cover 8 in place. The cover 9 and the housing 2 can optionally also be formed in one piece.

In order to prevent touching of the contact 4, an insulating sleeve 10 made of a also electrically nonconductive material surrounds it.

The contact 4 has a hole for the screw 6 that has a longitudinally extending external screw thread 11. The external thread 11 allows the screw 6 to be screwed into a corresponding internal thread of the mating plug connector and thus the plug-in process and the permanent fixing of the main plug connector in the mating plug connector (not shown) are effected.

The lower face of the circumferential flange of the head of the screw 6 presses on the electrical conductor 3, as a result of which it is in turn pressed onto the contact 4. This compressive force is further applied after the screw 6 has been tightened to the contact of the mating plug connector, so that the circumferential end face 5 of the contact 4 comes to rest on the corresponding circumferential end face of the contact of the mating plug connector in order to bring about a defined contact force and thus form a connection for energy transmission.

As already stated, the disadvantage of this prior art is that the cap 7 must be provided to avoid electrical contact with the voltage-carrying screw 6

While the known and disadvantageous state of the art has been described above with reference to FIG. 1, an advantageous embodiment according to the invention is described below with reference to FIGS. 2 to 4.

Figure 2:
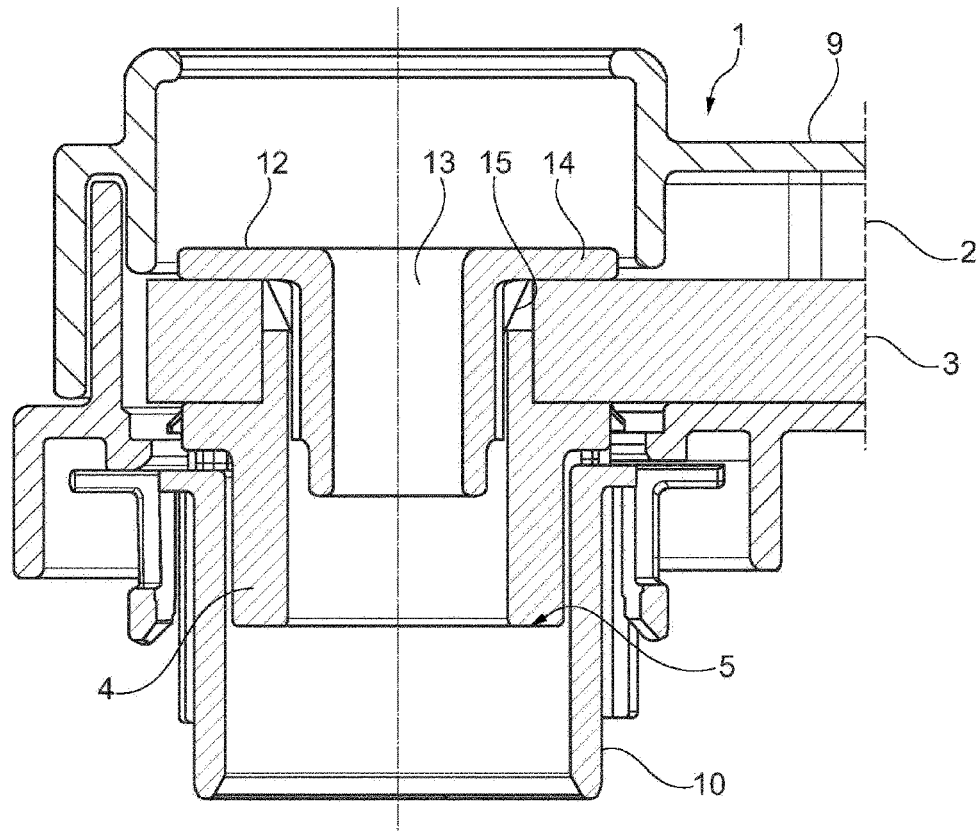
FIGS. 2 to 4 show an embodiment of a main plug connector according to the invention.

In the case of a substantially comparable construction of the main plug connector 1, an insulating element 12 is provided according to the present invention, the design and arrangement of which is shown in the main plug connector 1 in FIG. 2. This insulating element 12 has the effect that the screw 6 (not shown in FIG. 2) has no contact with voltage-conducting parts (such as the electrical conductor 3 and the contact 4). The insulating element 12 is between the electrical conductor 3 and the contact 4, in particular in its hole. It has a throughgoing hole 13 for the fastener, in particular the screw 6. It has a circumferential flange 14 with which it comes to rest on the surface around the hole in the electrical conductor 3. Below this flange 14, a preferably circumferential insertion bevel 15 is provided so that the insulating element 12 can be inserted in an aligned and defined manner into the hole in the electrical conductor 3, also here a busbar.

The insulating element 12 is fixed at its intended installation location, for example, by insertion into the hole in the electrical conductor 3, adhesive bonding, pressing, screwing or the like.

Figure 3:
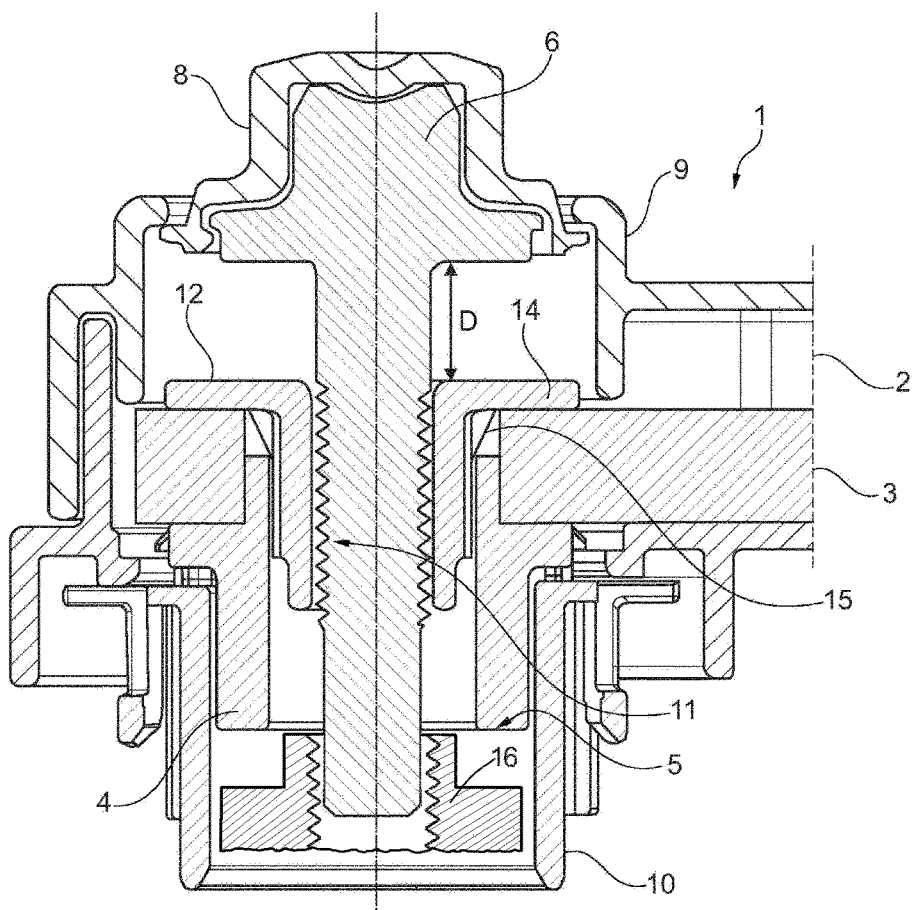

FIG. 3 shows the main plug connector 1 on the basis of the arrangement according to FIG. 2, with the screw 6 in place. The position of the screw 6 is such that the mating plug connector has not yet been inserted or attached to the main plug connector 1. Since the insulating element 12 does not have a thread in its feed-through hole 13, the external thread 11 of the screw 6 is also not in engagement with the insulating element 12, so that it is freely movable through the hole 13. This advantageously causes the attachment of the mating plug connector to the main plug connector 1 to press the screw 6 up as shown in viewing FIG. 3, so that a spacing D is formed between the surface of the circumferential flange 14 and the circumferential lower face of the screw head of the screw 6.

Figure 4:
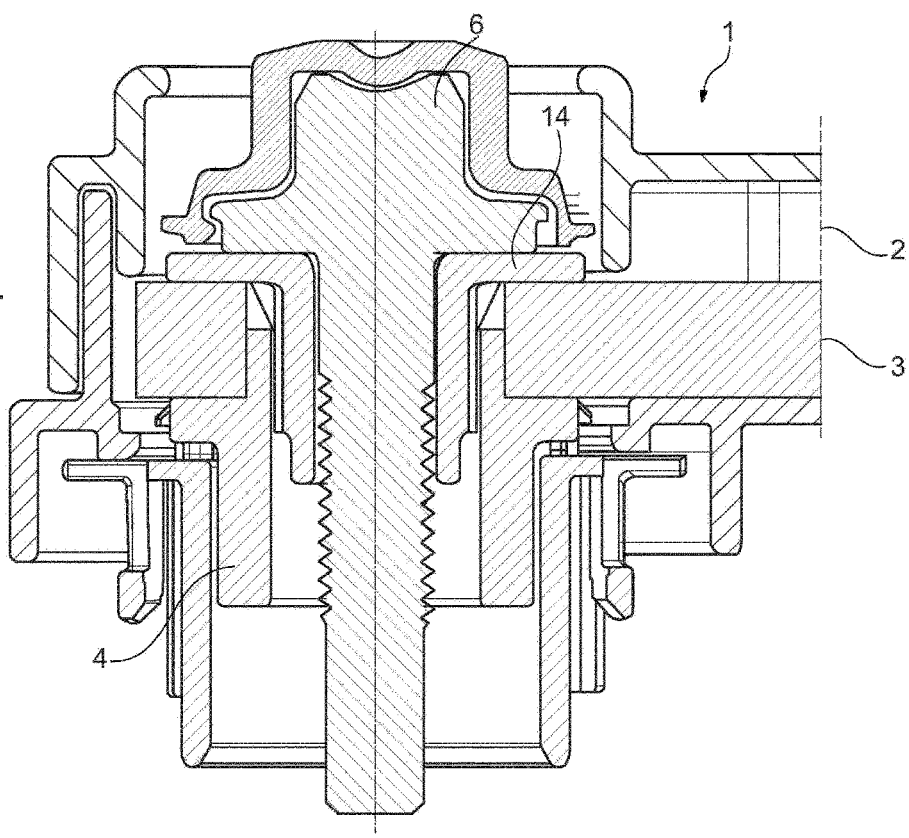

After the main plug connector 1 is brought into contact with the mating plug connector and has already been partially inserted, the screw 6 is turned by hand (since it is protected against electrical contact on the one hand, due to its configuration in particular its material and/or its coating itself, and possibly additionally by the cover 8) or with an electrically insulating tool (with or without a cover 8) so that rotation movement of the screw 6 screws its external thread 11 into a corresponding internal thread 16 of the housing or of the contact of the mating plug connector, so that, as a result, the spacing D is reduced, preferably as shown in FIG. 4, to zero.

FIG. 4 very clearly shows that the lower face of the circumferential screw head of the screw 6 presses on the electrical conductor 3 via the insulating circumferential flange 14 of the insulating element 12 and from there again onto the contact 4, so that as a result the circumferential end face 5 of the contact 4 moves into electrical contacting with and is permanently fixed to the corresponding circumferential end face of the contact of the mating plug-in connector.

So that axial movement of the fastener, in particular of the screw 6, is not impeded in its movement that has been described above with respect to FIGS. 2 to 4, the surface of the throughgoing hole 13 for the fastener, in particular the screw 6, is smooth. This means that the throughgoing hole 13 is not threaded.

Instead of an insulating element 12 that, as shown in FIG. 2, is fixedly on the electrical conductor 3 and/or the contact 4, it can also be below the screw head of the screw 6 and move therewith. It is also conceivable that the insulating element 12 in turn has an internal thread that corresponds to the external thread 11 of the screw 6. The insulating element 12 could also be a separate component that is pushed onto the external thread 11 of the screw 6 and is mounted therewith.

The mating plug connector can, like the main plug connector, also be at the end of an electrical conductor, in particular a busbar. However, it can also be a component of an electrical device, an battery, in particular a connection of a battery of an electric vehicle, or the like.

LIST OF REFERENCE SIGNS

| | |
|---|---|
| 1 | Plug-in connector |
| 2 | Housing |
| 3 | Electrical conductor |
| 4 | Contact |
| 5 | Circumferential end face |
| 6 | Screw |
| 7 | Cap |
| 8 | Cover |
| 9 | Cover |
| 10 | Insulating sleeve |
| 11 | External thread |
| 12 | Insulating element |
| 13 | Throughgoing hole |
| 14 | Circumferential flange |
| 15 | Circumferential insertion bevel |

The invention claimed is:

1. A plug-in connection comprising:
a main plug connector having a housing;
a mating plug connector that can be plugged together with the main plug connector;
an electrical conductor inserted into the housing;
a contact in the housing, electrically connected with the electrical conductor and having a circumferential end face electrically contactable with an end face of the mating plug connector in such a way that the end faces bear on each other when the main plug connector and mating plug connector are plugged together;
a screw fastener bearing on the contact, threadable into the mating plug connector, and rotatable to press the end face of the contact against the end face of the mating plug connector; and
an insulating element ensuring that the screw fastener has no contact with voltage-conducting parts including the electrical conductor and/or the contact;
wherein the insulating element includes a throughgoing hole for the screw fastener configured such that the screw fastener is freely movable through the throughgoing hole in the insulating element; and/or
wherein attachment of the mating plug connector to the main plug connector presses the screw fastener upwardly whereby a spacing is formed between a surface of a circumferential flange of the insulating element and a circumferential lower face of a screw head of the screw fastener, which spacing is reduced when an external thread of the screw fastener is threaded into a corresponding internal thread of the housing or the mating plug connector.

2. A plug-in connection comprising:
a main plug connector having a housing;
a mating plug connector that can be plugged together with the main plug connector;

an electrical conductor inserted into the housing;
a contact also in the housing, electrically connected with the electrical conductor and having a circumferential end face engageable with an end face of the mating plug connector in such a way that the end faces bear on each other when the main plug connector and mating plug connector are plugged together; and
a screw fastener bearing on the contact and threaded into the mating plug connector to press the end faces together, the screw fastener consisting entirely of an electrically nonconductive material ensuring that the screw fastener has no contact with voltage-conducting parts including the electrical conductor and/or the contact.

3. The plug-in connection according to claim 1, wherein a surface of the throughgoing hole for the screw fastener is smooth such that the external thread of the screw fastener is not in threaded engagement with the insulating element whereby the screw fastener is freely movable through the throughgoing hole in the insulating element.

4. The plug-in connection according to claim 1, wherein the insulating element has the circumferential flange with which the insulating element comes to rest on the electrical conductor around a hole in the electrical conductor.

5. The plug-in connection according to claim 4, wherein the insulating element has a circumferential insertion bevel below the circumferential flange that is non-perpendicular and slanted relative to a lower surface of the circumferential flange for guiding the insulating element into the hole in electrical conductor, so that the insulating element is insertable in an aligned and defined manner into the hole in the electrical conductor.

6. The plug-in connection according to claim 1, wherein the surface of the throughgoing hole for the screw fastener is smooth such that:
the external thread of the screw fastener is not in threaded engagement with the insulating element whereby the screw fastener is freely movable through the throughgoing hole in the insulating element; and
attachment of the mating plug connector to the main plug connector presses the screw fastener upwardly whereby the spacing is formed between the surface of the circumferential flange and the circumferential lower face of the screw head of the screw fastener, which spacing is reduced when the external thread of the screw fastener is threaded into the corresponding internal thread of the housing or the mating plug connector.

7. The plug-in connection according to claim 4, wherein the insulating element has an insulating sleeve adjoining and extending from the circumferential flange of the insulating element, and the circumferential flange and the insulating sleeve consist of the same electrically nonconductive material or consist of different electrically nonconductive materials.

8. The plug-in connection according to claim 7, wherein the material of the insulating sleeve is polybutylene terephthalate or polyether ether ketone and the circumferential flange consists of PEEK GF20 or a ceramic material or of an anodized metal material.

9. The plug-in connection according to claim 7, wherein the insulating element consists entirely of PEEK GF20 or PEEK GF30, or of a ceramic material or of an anodized metal material.

10. The plug-in connection according to claim 1, further comprising a cover on an end turned away from a free end of the screw fastener in a region of a screw head of the screw fastener.

11. The plug-in connection according to claim 10, further comprising, in addition to the cover, a further cover on the housing.

12. The plug-in connection according to claim 1, wherein:
the insulating element has the circumferential flange with which the insulating element comes to rest on the electrical conductor around a hole in the electrical conductor;
the insulating element has a circumferential insertion bevel below the circumferential flange that is non-perpendicular and slanted relative to a lower surface of the circumferential flange for guiding the insulating element into the hole in electrical conductor, so that the insulating element is insertable in an aligned and defined manner into the hole in the electrical conductor;
the insulating element has an insulating sleeve adjoining the circumferential flange of the insulating element;
an outer diameter of the circumferential flange is larger than the hole in the electrical conductor for the insulating element;
an outer diameter of the insulating sleeve largely corresponds to an inner diameter of the hole in the electrical conductor, so that the insulating sleeve can be fitted into the hole in the electrical conductor; and
a surface of the throughgoing hole for the screw fastener is smooth such that:
the external thread of the screw fastener is not in threaded engagement with the insulating element whereby the screw fastener is freely movable through the throughgoing hole in the insulating element; and
attachment of the mating plug connector to the main plug connector presses the screw fastener upwardly whereby a spacing is formed between a surface of the circumferential flange and a circumferential lower face of a screw head of the screw fastener, which spacing is reduced when the external thread of the screw fastener is threaded into a corresponding internal thread of the housing or the mating plug connector.

13. The plug-in connection according to claim 12, wherein:
the insulating sleeve is not acted upon by tightening forces and compressive forces of the screw fastener in the plugged-together state of the plug-in connection;
the circumferential flange is acted upon by pressure forces and in the plugged-together state of the plug-in connection, such that that the circumferential flange is subjected to permanent forces, and the circumferential flange comprises an electrically nonconductive material for permanently withstanding the forces acted upon the circumferential flange in the plugged-together state of the plug-in connection; and
the circumferential flange and the insulating sleeve consist of different electrically nonconductive materials and are configured to avoid leakage currents, achieve contact protection, realize required tightening forces with the screw fastener, and ensure long-term stability.

14. The plug-in connection according to claim 2, wherein attachment of the mating plug connector to the main plug connector presses the screw fastener upwardly whereby a spacing is formed below a circumferential lower face of a screw head of the screw fastener, which spacing is reduced when an external thread of the screw fastener is threaded into a corresponding internal thread of the housing or the mating plug connector.

15. A plug-in connection comprising:
a main plug connector having a housing;
a mating plug connector that can be plugged together with the main plug connector;
an electrical conductor inserted into the housing;
a contact in the housing, electrically connected with the electrical conductor and having a circumferential end face electrically contactable with an end face of the mating plug connector in such a way that the end faces bear on each other when the main plug connector and mating plug connector are plugged together;
a screw fastener bearing on the contact, threadable into the mating plug conductor, and rotatable to press the end face of the contact against the end face of the mating plug conductor; and
an insulating coating of the screw fastener ensuring that the screw fastener has no contact with voltage-conducting parts including the electrical conductor and/or the contact.

16. The plug-in connection according to claim 15, wherein:
the screw fastener includes a core of metal material for achieving tightening forces higher than plastic material; and
the insulating coating comprises an electrically nonconductive coating on an external surface of the screw fastener in at least in regions at which the screw fastener can be touched, thereby ensuring that the core of metal material of the screw fastener has no contact with voltage-conducting parts including the electrical conductor and/or the contact.

17. The plug-in connection according to claim 16, wherein the external surface of the screw fastener is provided completely with the electrically nonconductive coating.

18. The plug-in connection according to claim 16, wherein the electrically nonconductive coating comprises a nanocoating.

19. The plug-in connection according to claim 16, wherein the electrically nonconductive coating comprises plastic encapsulation.

20. The plug-in connection according to claim 15, wherein attachment of the mating plug connector to the main plug connector presses the screw fastener upwardly whereby a spacing is formed below a circumferential lower face of a screw head of the screw fastener, which spacing is reduced when an external thread of the screw fastener is threaded into a corresponding internal thread of the housing or the mating plug connector.

* * * * *